(12) United States Patent
Nordstrom et al.

(10) Patent No.: US 6,173,997 B1
(45) Date of Patent: Jan. 16, 2001

(54) FLEXIBLE ENTRY BOOT

(75) Inventors: Daniel P. Nordstrom, Twin Lake, MI (US); Andrew Youngs, Granger, IN (US)

(73) Assignee: Advanced Polymer Technology, Inc., Muskegon, MI (US)

(*) Notice: Under 35 U.S.C. 154(b), the term of this patent shall be extended for 0 days.

(21) Appl. No.: 09/227,653

(22) Filed: Jan. 8, 1999

Related U.S. Application Data

(63) Continuation-in-part of application No. 09/098,157, filed on Jun. 16, 1998, now Pat. No. 5,961,155, which is a continuation of application No. 08/680,220, filed on Jul. 11, 1996, now Pat. No. 5,810,400.

(51) Int. Cl.[7] .................................................... F16L 41/06

(52) U.S. Cl. .................................... 285/139.1; 285/139.3; 285/141.1; 285/142.1; 285/148.26; 285/192; 285/205; 285/422; 285/139.2

(58) Field of Search ............................. 285/136.1, 139.2, 285/139.3, 141.1, 142.1, 205, 222.1, 222.2, 192, 148.26, 139.1

(56) References Cited

U.S. PATENT DOCUMENTS

| | | |
|---|---|---|
| D. 309,308 | 7/1990 | Webb . |
| D. 313,418 | 1/1991 | Webb . |
| D. 322,970 | 1/1992 | Webb . |
| 845,760 | 3/1907 | Coffin . |
| 1,317,260 | 7/1919 | Armstrong . |
| 1,582,191 | 4/1926 | Snooke . |
| 1,639,495 | 8/1927 | Frame . |
| 1,712,510 | 5/1929 | Monie . |
| 1,793,038 | 3/1931 | Zimmerman . |

(List continued on next page.)

FOREIGN PATENT DOCUMENTS

| | | |
|---|---|---|
| 150132 | 5/1951 | (AU) . |
| 200618 | 10/1955 | (AU) . |
| 1068961 | 1/1980 | (CA) . |
| 2047354 | 1/1992 | (CA) . |
| 0424638 | 5/1967 | (CH) . |
| 0951281 | 10/1956 | (DE) . |
| 2253857 | 5/1973 | (DE) . |
| 2226508 | 12/1973 | (DE) . |
| 3016401 | 2/1981 | (DE) . |
| 0944434 | 11/1948 | (FR) . |
| 1496531 | 10/1965 | (FR) . |
| 0209931 | 1/1924 | (GB) . |

(List continued on next page.)

OTHER PUBLICATIONS

Hofit, *Instructions for the Installation of Hofit Chambers*, pp. A1/17–A17/17.

(List continued on next page.)

*Primary Examiner*—Dave W. Arola
(74) *Attorney, Agent, or Firm*—Young & Basile, P.C.

(57) ABSTRACT

A flexible entry boot assembly provides a fluid-tight fitting between a wall of a fluid containment region and a conduit passing through the wall. The flexible entry boot assembly comprises a seal member disposed within the containment region. A securing plate, disposed within the containment region, is releasably mounted to the seal member. A hollow support sleeve, integral with the seal member, extends axially into the containment region. The support sleeve has an outer surface and an inner, conduit receiving surface, and further has a degree of flexibility sufficient to allow for the insertion of the conduit at angles equal to or other than an angle normal to the fluid containment wall while maintaining a fluid-tight environment. The flexible boot assembly further comprises a mechanism for releasably attaching the hollow support sleeve to the conduit. A flexible, corrosion resistant sealing ring member is disposed outside the containment region. A mechanism, carried by the sealing ring member, is provided for releasably attaching the seal member to the wall of the containment region.

16 Claims, 5 Drawing Sheets

U.S. PATENT DOCUMENTS

| | | |
|---|---|---|
| 2,151,770 | 3/1939 | James . |
| 2,254,668 | 9/1941 | Tomek . |
| 2,310,877 | 2/1943 | Sperry . |
| 2,336,150 | 12/1943 | Horvath . |
| 2,410,999 | 11/1946 | Reisner . |
| 2,441,009 | 5/1948 | Cunningham . |
| 2,449,229 | 9/1948 | Hopwood . |
| 2,671,573 | 3/1954 | Hendon et al. . |
| 2,688,497 | 9/1954 | Brisack . |
| 2,691,538 | 10/1954 | Clausen . |
| 2,717,792 | 9/1955 | Pelley . |
| 2,813,692 | 11/1957 | Bremer et al. . |
| 2,870,811 | 1/1959 | Rogge . |
| 2,906,500 | 9/1959 | Knapp et al. . |
| 2,911,001 | 11/1959 | Fuller . |
| 3,010,598 | 11/1961 | Foss . |
| 3,098,663 | 7/1963 | Dibley . |
| 3,178,206 | 4/1965 | Martin et al. . |
| 3,243,240 | 3/1966 | Arthur . |
| 3,362,425 | 1/1968 | Morris et al. . |
| 3,389,560 | 6/1968 | Zemsky . |
| 3,390,224 | 6/1968 | Wyatt . |
| 3,401,958 | 9/1968 | Demyon . |
| 3,408,778 | 11/1968 | Mason . |
| 3,423,518 | 1/1969 | Weagant . |
| 3,439,837 | 4/1969 | Hearn et al. . |
| 3,459,229 | 8/1969 | Croft . |
| 3,518,359 | 6/1970 | Trimble et al. . |
| 3,531,264 | 9/1970 | Greipel . |
| 3,543,377 | 12/1970 | Bremner . |
| 3,615,034 | 10/1971 | Lemelson . |
| 3,654,382 | 4/1972 | Rubright . |
| 3,707,852 | 1/1973 | Burckhardt . |
| 3,712,009 | 1/1973 | Campagna . |
| 3,715,958 | 2/1973 | Crawford et al. . |
| 3,721,270 | 3/1973 | Wittgenstein . |
| 3,759,280 | 9/1973 | Swanson . |
| 3,802,456 | 4/1974 | Wittgenstein . |
| 3,858,752 | 1/1975 | Marvin, Jr. et al. . |
| 3,859,802 | 1/1975 | Platner et al. . |
| 3,882,976 | 5/1975 | Nash . |
| 3,905,405 | 9/1975 | Fowler et al. . |
| 3,938,285 | 2/1976 | Gilbu . |
| 3,972,440 | 8/1976 | Warren . |
| 3,995,332 | 12/1976 | Forchini et al. . |
| 3,997,760 | 12/1976 | Salinger . |
| 4,062,376 | 12/1977 | McGrath . |
| 4,076,040 | 2/1978 | Alpers et al. . |
| 4,082,301 | 4/1978 | Salinger . |
| 4,089,139 | 5/1978 | Moffa et al. . |
| 4,109,976 | 8/1978 | Koch . |
| 4,132,083 | 1/1979 | McGrath . |
| 4,145,075 | 3/1979 | Holzmann . |
| 4,182,581 | 1/1980 | Uehara et al. . |
| 4,215,868 | 8/1980 | Skinner et al. . |
| 4,230,234 | 10/1980 | Taylor . |
| 4,249,758 | 2/1981 | Harris . |
| 4,262,166 | 4/1981 | Radzishevsky et al. . |
| 4,275,757 | 6/1981 | Singer . |
| 4,291,905 | 9/1981 | Schrock . |
| 4,309,128 | 1/1982 | Williams . |
| 4,327,925 | 5/1982 | Alexander et al. . |
| 4,365,829 | 12/1982 | Fowler . |
| 4,387,900 | 6/1983 | Ditcher et al. . |
| 4,449,715 | 5/1984 | Gagas . |
| 4,449,853 | 5/1984 | Mennella et al. . |
| 4,472,911 | 9/1984 | Jooris et al. . |
| 4,492,392 | 1/1985 | Woods et al. . |
| 4,512,148 | 4/1985 | Jacobson . |
| 4,530,443 | 7/1985 | Gorges . |
| 4,540,310 | 9/1985 | Ditcher et al. . |
| 4,552,386 | 11/1985 | Bwichette . |
| 4,568,925 | 2/1986 | Butts . |
| 4,619,555 | 10/1986 | Skinner et al. . |
| 4,621,941 | 11/1986 | Ditcher et al. . |
| 4,639,164 | 1/1987 | Pugnale et al. . |
| 4,659,251 | 4/1987 | Petter et al. . |
| 4,667,505 | 5/1987 | Sharp . |
| 4,685,327 | 8/1987 | Sharp . |
| 4,696,330 | 9/1987 | Raudman et al. . |
| 4,702,645 | 10/1987 | Skinner et al. . |
| 4,709,723 | 12/1987 | Sidaway et al. . |
| 4,711,365 | 12/1987 | Fomby . |
| 4,714,095 | 12/1987 | Muller et al. . |
| 4,717,036 | 1/1988 | Dundas et al. . |
| 4,731,501 | 3/1988 | Clark et al. . |
| 4,747,453 | 5/1988 | Howard, Sr. . |
| 4,763,806 | 8/1988 | Podgers et al. . |
| 4,767,108 | 8/1988 | Tanaka et al. . |
| 4,770,317 | 9/1988 | Podgers et al. . |
| 4,770,562 | 9/1988 | Muller et al. . |
| 4,775,073 | 10/1988 | Webb . |
| 4,782,430 | 11/1988 | Robbins et al. . |
| 4,797,513 | 1/1989 | Ono et al. . |
| 4,805,444 | 2/1989 | Webb . |
| 4,809,866 | 3/1989 | Crocker . |
| 4,870,856 | 10/1989 | Sharp . |
| 4,871,084 | 10/1989 | Robbins . |
| 4,890,863 | 1/1990 | Westhoff et al. . |
| 4,896,705 | 1/1990 | Podgers et al. . |
| 4,905,940 | 3/1990 | Luka . |
| 4,912,287 | 3/1990 | Ono et al. . |
| 4,924,923 | 5/1990 | Boehmer et al. . |
| 4,928,349 | 5/1990 | Oikawa et al. . |
| 4,932,257 | 6/1990 | Webb . |
| 4,958,957 | 9/1990 | Berg et al. . |
| 4,961,670 | 10/1990 | McKenzie et al. . |
| 4,968,179 | 11/1990 | Frahm . |
| 4,971,225 | 11/1990 | Bravo . |
| 4,971,477 | 11/1990 | Webb et al. . |
| 5,002,428 | 3/1991 | Shettel . |
| 5,030,033 | 7/1991 | Heintzelman et al. . |
| 5,039,137 | 8/1991 | Cankovic et al. . |
| 5,040,408 | 8/1991 | Webb . |
| 5,054,794 | 10/1991 | Westhoff et al. . |
| 5,058,633 | 10/1991 | Sharp . |
| 5,060,509 | 10/1991 | Webb . |
| 5,062,457 | 11/1991 | Zimmons . |
| 5,076,456 | 12/1991 | Geyer . |
| 5,085,257 | 2/1992 | Smith . |
| 5,098,221 | 3/1992 | Osborne . |
| 5,099,894 | 3/1992 | Mozeley, Jr. . |
| 5,105,966 | 4/1992 | Fort et al. . |
| 5,114,271 | 5/1992 | Sunderhaus et al. . |
| 5,117,877 | 6/1992 | Sharp . |
| 5,129,428 | 7/1992 | Winter et al. . |
| 5,129,684 | 7/1992 | Lawrence et al. . |
| 5,134,878 | 8/1992 | Sharp . |
| 5,150,927 | 9/1992 | Skinner . |
| 5,156,292 | 10/1992 | Ross . |
| 5,209,601 | 5/1993 | Odill et al. . |
| 5,257,652 | 11/1993 | Lawrence . |
| 5,263,794 | 11/1993 | Webb . |
| 5,271,518 | 12/1993 | Webb . |
| 5,295,760 | 3/1994 | Rowe . |
| 5,297,896 | 3/1994 | Webb . |
| 5,333,490 | 8/1994 | Webb . |
| 5,366,318 | 11/1994 | Brancher . |
| 5,372,453 | 12/1994 | Argandona . |
| 5,398,976 | 3/1995 | Webb . |
| 5,423,447 | 6/1995 | Youngs . |

| | | |
|---|---|---|
| 5,431,457 | 7/1995 | Youngs. |
| 5,481,790 | 1/1996 | Koreis et al.. |
| 5,482,400 | 1/1996 | Bavington. |
| 5,490,419 | 2/1996 | Webb. |
| 5,501,472 | 3/1996 | Brancher et al.. |
| 5,704,656 | 1/1998 | Rowe. |
| 5,722,699 | 3/1998 | Brancher. |

FOREIGN PATENT DOCUMENTS

| | | |
|---|---|---|
| 0595584 | 12/1947 | (GB). |
| 595584 | 12/1947 | (GB). |
| 0632756 | 12/1949 | (GB). |
| 0667165 | 2/1952 | (GB). |
| 1087178 | 10/1967 | (GB). |
| 1114475 | 5/1969 | (GB). |
| 3-51430 | 3/1991 | (JP). |
| 0245418 | 6/1969 | (RU). |
| 1352272 | 11/1987 | (RU). |
| WO 90/04157 | 4/1990 | (WO). |
| WO 90/07074 | 6/1990 | (WO). |
| WO 93/17266 | 9/1993 | (WO). |
| WO 95/09998 | 4/1995 | (WO). |

OTHER PUBLICATIONS

Owens–Corning Fiberglas, Piping Sumps—For Secondary Containment of Pumps & Piping (Installation & Specification), pp. 1–9 (Dec. 1985).

Total Containment Inc., *Multisided Tank Sumps* (Jul. 1, 1994).

Total Containment Inc., *Sump/Risers*.

Total Containment Inc., *Sump/Risers—Installation Instructions* (Apr. 15, 1989).

Total Containment Inc., *Sump/Riser Installation Instructions for Single Access Lids* (Nov. 23, 1992).

Total Containment Inc., *Enviroflex—Flexible Double–Wall Piping System* (Mar. 1, 1991).

Eviron Products Inc., *Eviron Safe Products—Designed for Future Generations* (1993).

Eviron Products Inc., *Installation Intstructions—Deep Burial Sumps* (Sep. 1, 1993).

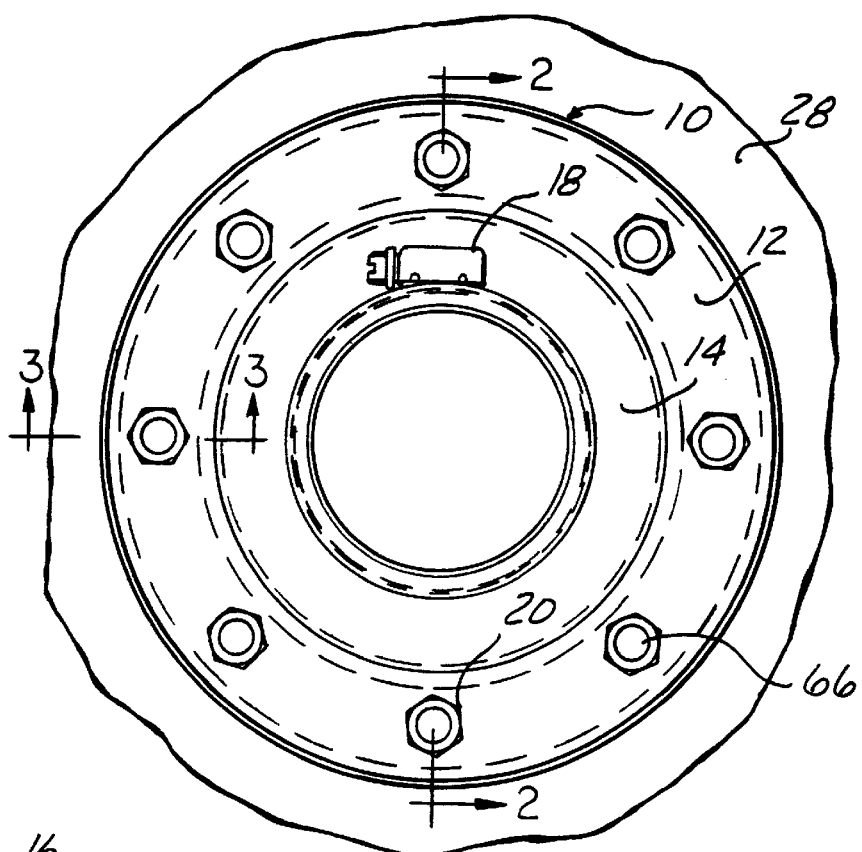
FIG-1
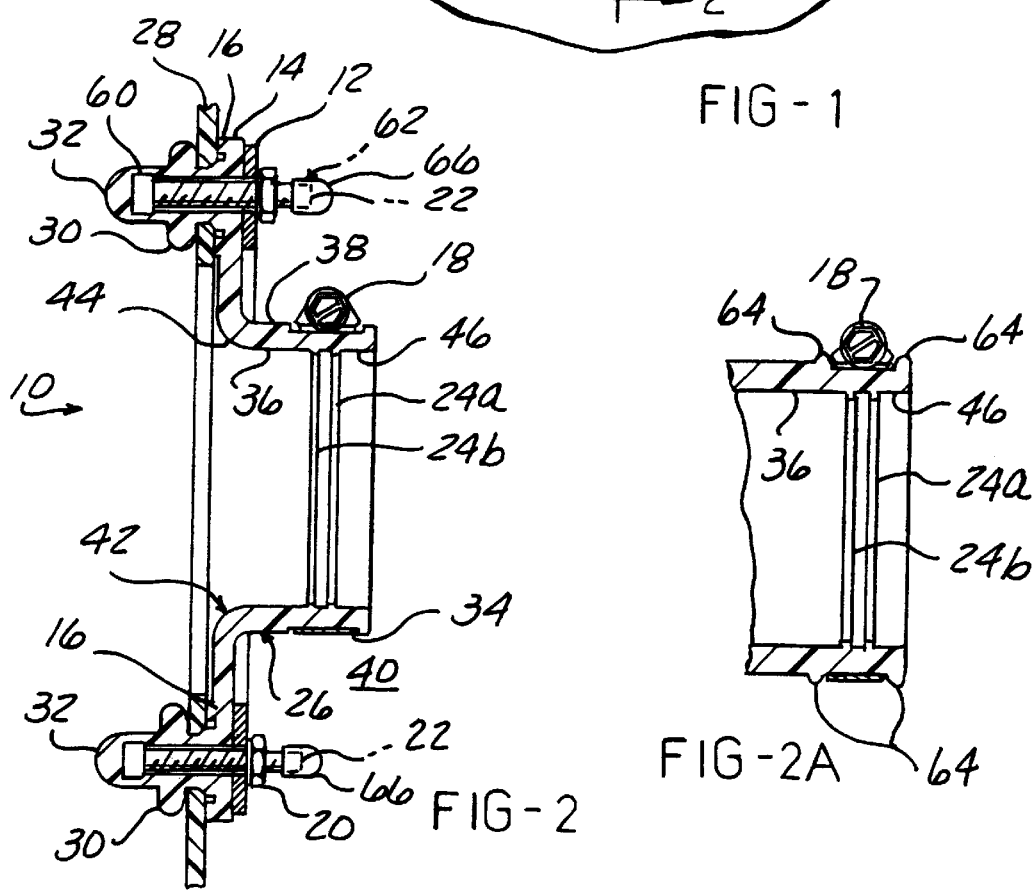
FIG-2
FIG-2A

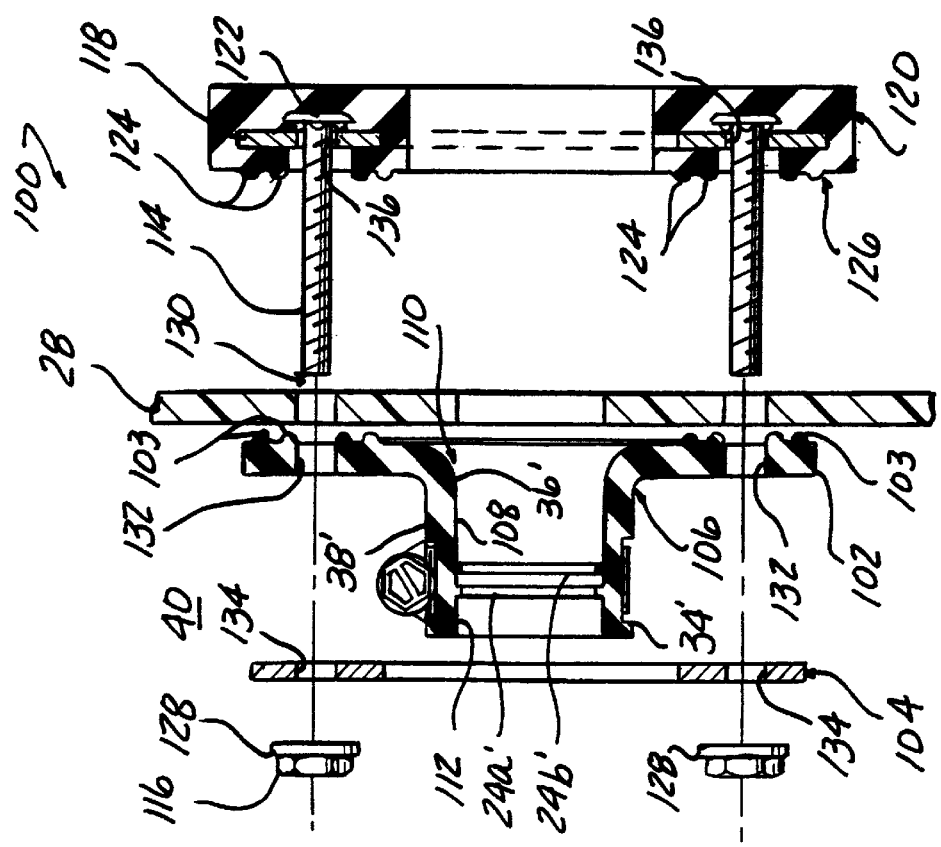
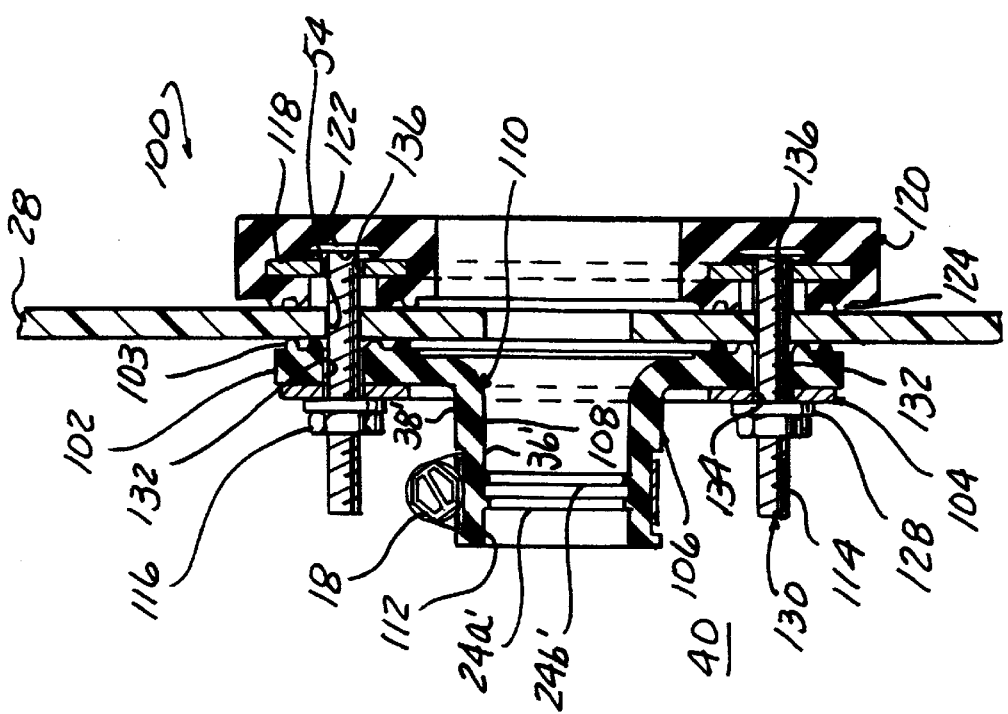

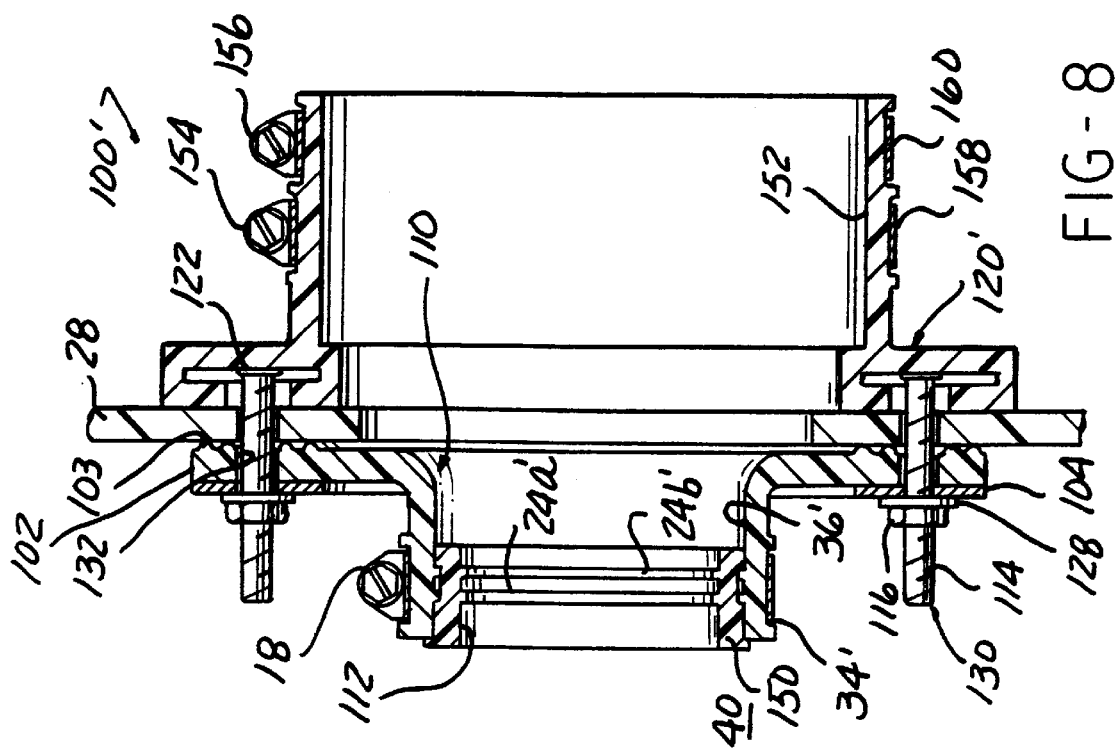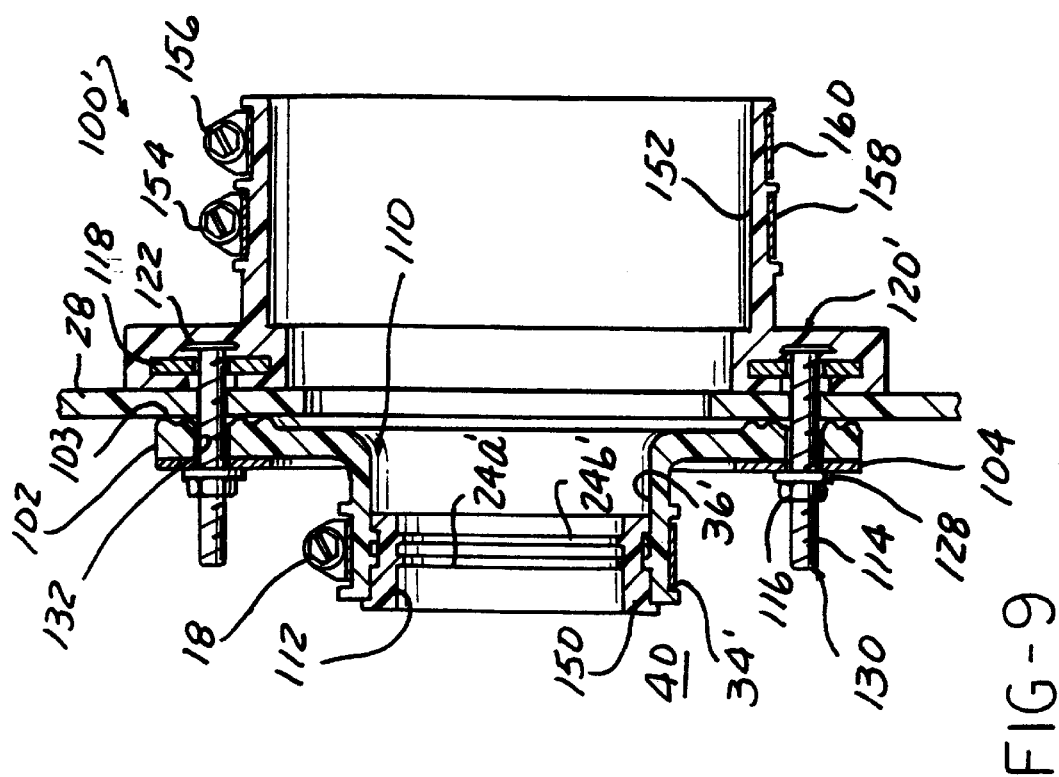

FLEXIBLE ENTRY BOOT

CROSS REFERENCE TO RELATED APPLICATIONS

This application is a continuation-in-part of U.S. Ser. No. 09/098,157, filed Jun. 16, 1998, now U.S. Pat. No. 5,961,155 issued Oct. 5, 1999, which is itself a continuation of U.S. Ser. No. 08/680,220, filed Jul. 11, 1996, now U.S. Pat. No. 5,810,400 issued Sep. 22, 1998.

BACKGROUND OF THE INVENTION

The present invention relates generally to a fitting for a containment chamber and, more particularly, to a flexible entry boot for providing a fluid-tight fitting between a wall of a fluid containment region and a conduit passing through the wall.

For many years in the area of fluid fittings, some structures have been of a permanent variety which include welding or bonding of the exterior wall of the conduit to the wall opening of the fluid containment region through which the conduit extends. Other structures, such as that disclosed by Webb in U.S. Pat. No. 4,775,073, disclose the use of a fitting system which is installed at a factory and then adapted by the user to fit his needs. Such manufacturing processes of fluid containment structures are limited since they require built-in fitting systems for which some users may not have any need.

Moreover, many of these fitting structures require fixedly attaching the conduit at an angle perpendicular to the containment region wall. For example, U.S. Pat. No. 5,129,684 issued to Lawrence; U.S. Pat. No. 4,775,073 issued to Webb; U.S. Pat. No. 4,492,392 issued to Woods; and U.S. Pat. No. 2,310,877 issued to Sperry all teach conduit fitting systems which require the conduit to be placed at an angle normal to the containment wall. If the angle is not normal, the fluid-tight seal will be breached. Such requirements greatly inhibit the use of the fitting system since a conduit cannot be inserted into the containment wall at angles which are other than normal while still maintaining a fluid-tight environment.

Furthermore, many structures require the sealing member to be fully or partially disposed outside the containment region. For example, U.S. Pat. No. 5,129,684 issued to Lawrence; U.S. Pat. No. 4,924,923 issued to Boehmer; U.S. Pat. No. 4,775,073 issued to Webb; U.S. Pat. No. 4,492,392 issued to Woods; U.S. Pat. No. 4,082,301 issued to Salinger; U.S. Pat. No. 3,759,280 issued to Swanson; and U.S. Pat. No. 2,717,792 issued to Phelly disclose sealing members existing at least in part outside the containment region. Such a requirement exposes the sealing member to ground and weather exposure, which results in an eventual wearing out of the sealing member, thereby causing a breach in the fluid-tight environment.

Thus, it is an object of the present invention to provide a fluid-tight entry boot for use with fluid-tight fitting systems, which boot has the advantage of easy installation for a user. It is a further object of the present invention to provide such an entry boot which has a sealing member substantially fully disposed within the containment region, which advantageously protects the sealing member from ground and weather exposure. Yet still further, it is an object of the present invention to provide such an entry boot which allows for the insertion of a conduit into a containment wall opening at angles which are not necessarily normal while maintaining a fluid-tight environment. Still further, it is an object of the present invention to provide such a fluid-tight system which is of simple construction and relatively easy and inexpensive to manufacture and install.

SUMMARY OF THE INVENTION

The present invention addresses and solves the above-mentioned problems and meets the enumerated objects and advantages, as well as others not enumerated, by providing a flexible entry boot assembly for providing a fluid-tight fitting between a wall of a fluid containment region and a conduit passing through the wall. The flexible entry boot assembly comprises a seal member adapted to be disposed within the containment region. A securing plate, adapted to be disposed within the containment region, is releasably mounted to the seal member. A hollow support sleeve, integral with the seal member, is adapted to extend axially into the containment region. The support sleeve has an outer surface and an inner, conduit receiving surface, and further has a degree of flexibility sufficient to allow for the insertion of the conduit at angles equal to or other than an angle normal to the fluid containment wall while maintaining a fluid-tight environment. The flexible boot assembly further comprises means for releasably attaching the hollow support sleeve to the conduit. A flexible, corrosion resistant sealing ring member is adapted to be disposed outside the containment region. Means, carried by the sealing ring member, are provided for releasably attaching the seal member to the wall of the containment region.

BRIEF DESCRIPTION OF THE DRAWINGS

Other objects, features and advantages of the present invention will become apparent by reference to the following detailed description and drawings, in which:

FIG. 1 is a front view of the integrally formed flexible entry boot of the present invention, shown installed in a fluid containment wall which is broken away;

FIG. 2 is a cross-sectional view taken on line 2—2 of FIG. 1;

FIG. 2A is a cutaway view of an alternate embodiment of the hollow support sleeve-to-conduit attaching means shown in FIG. 2;

FIG. 6 is a cross-sectional view taken on line 6—6 of FIG. 5;

FIG. 7 is the cross-sectional view of FIG. 6 shown in an exploded manner;

FIG. 8 is a cross-sectional view showing an alternate embodiment of the entry boot of FIG. 6; and FIG. 9 is a cross-sectional view showing an alternate embodiment of the entry boot of FIG. 8.

DETAILED DESCRIPTION OF THE PREFERRED EMBODIMENTS

Figure 3:
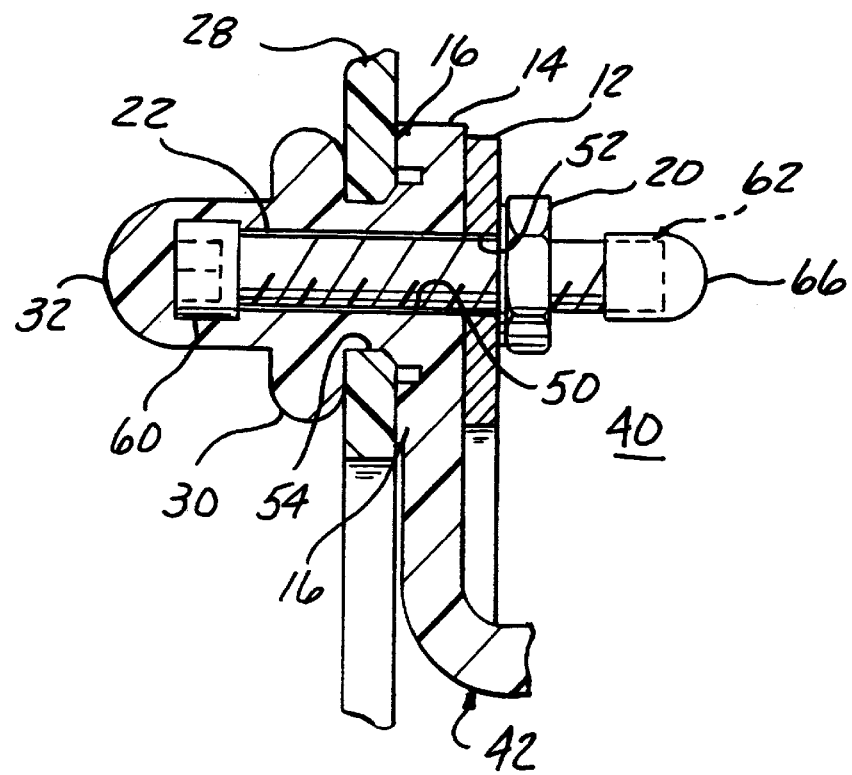
FIG. 3 is an enlarged cross-sectional view taken on line 3—3 of FIG. 1.

Referring now to FIG. 1, the integrally formed flexible entry boot of the present invention is designated generally as 10. Entry boot 10 provides a fluid-tight fitting between a wall 28 of a fluid containment region 40 and a conduit (not shown) passing through wall 28. Flexible entry boot 10 comprises a seal member 14 disposed within containment region 40. Seal member 14 may also have sealing beads 16 integrally formed therewith and extending outwardly therefrom. However, it is to be understood that separate sealing washers, gaskets, or the like, may also be used. This seal member 14 may be formed of any suitable material, depending upon the particular requirements due to the fluid contained. Preferably, the seal member 14 will be formed from an oil and gas resistant material, or any other material which will be resistant to alcohols and hydrocarbons. More preferably, the seal member 14 is comprised of nitrile rubber and/or viton rubber, thermoplastic elastomers or epichlorohydrin rubber. Further, seal member 14 may be of any suitable shape and size, depending upon the manufacturer and particular end use. In the preferred embodiment, the seal member 14 is circular, as shown in FIG. 1.

Flexible entry boot 10 may further comprise a screw securing plate 12 attached to seal member 14. Similarly, this screw securing plate 12 may also be of any desired size and shape and of any suitable material. In the preferred embodiment, the screw securing plate 12 is circular and is formed from a suitable metal material.

Referring now to FIG. 2, a flexibly rigid, cylindrical hollow support sleeve 26 has a degree of flexibility sufficient to allow for the insertion of the conduit at angles less than or equal to a 90° angle, i.e. the conduit does not need to be inserted precisely perpendicular to the containment wall 28 in order to maintain a fluid-tight environment, and has a degree of flexion such that if moved after fitted, the fluid-tight environment remains intact. The amount of flexion may be any suitable desired amount, however, in the preferred embodiment, the hollow sleeve 26 provides for up to approximately a 30° offset from normal (90°) in any direction.

Hollow sleeve 26 has a first open end portion 42 integrally attached to seal member 14, first open portion 42 having a central throughbore 44 in fluid communication with hollow support sleeve 26. Sleeve 26 has a second open end portion 46 opposed to, and integrally attached to first open portion 42, with first open portion 42 adapted to flexibly receive a conduit, and second open portion 46 adapted to releasably hold the conduit in place. It is to be understood that hollow support sleeve 26 may be formed in any suitable shape and of any suitable material, and may provide any degree of flexion as necessitated by the particular manufacturer and end use, as long as such choices serve the objects and advantages of the present invention as set forth hereinabove.

Means are provided for releasably attaching hollow support sleeve 26 to the conduit. It is to be understood that this releasable conduit attaching means may comprise any suitable means. However, in the preferred embodiment, this conduit attaching means comprises a hose clamp 18.

Flexible entry boot 10 further comprises means, extending outwardly from containment region 40, for releasably attaching seal member 14 to wall 28 of containment region 40. Again, it is to be understood that this seal member attaching means may comprise any suitable means. However, in the preferred embodiment, this attaching means comprises a plurality of screw 22 and nut 20 assemblies, as best seen in FIG. 3.

Although eight screw 22 and nut 20 assemblies are shown, it is to be understood that any suitable number may be used. Generally, the smaller diameter the conduit, the smaller diameter the seal member 14 is. Further, the smaller seal member 14 is, the fewer screw 22 and nut 20 assemblies are generally necessary (for example, see the front view of the alternate embodiment shown in FIG. 5). For illustrative, non-limitative purposes, a ½", ¾" and 1" conduit may use a seal member 14 having four screw 22 and nut 20 assemblies; while a 1 ½", 2" or larger conduit may use a seal member 14 having eight screw 22 and nut 20 assemblies.

The screw and nut assemblies may be any conventionally known assemblies, and further, it is to be understood that any known and suitable fastening means may be used. In the preferred embodiment, the seal member attaching means may further comprise a screw cap-like end portion 32 tightly surrounding and conforming to an end 60 of each screw 22. Any suitable screw may be used, however, in the preferred embodiment, as can best be seen in FIGS. 2 and 4, end 60 comprises the head of a socket head cap screw. Screw 22 may also comprise a flanged washer hex head cap screw with a screwdriver slot (not shown).

The seal member-to-containment wall attachment means may further comprise a plurality of flexible bushings 30 disposed between each nut 20 and screw cap-like end portion 32. As can clearly be seen in FIG. 3, nut 20 is attached at a screw end 62 opposite the end 60 at which screw cap-like end portion 32 is disposed. Screw cap-like end portions 32 and bushings 30, in that they are exposed to the surrounding soil or other environment, are preferably formed from a suitable corrosion resistant material. It is to be understood that any suitable material may be used. However, in the preferred embodiment, screw cap-like end portions 32, flexible bushings 30 and seal member 14 are all integrally formed and/or molded from nitrile rubber, viton rubber, thermoplastic elastomers or epichlorohydrin rubber into a one-piece unit.

Figure 4:
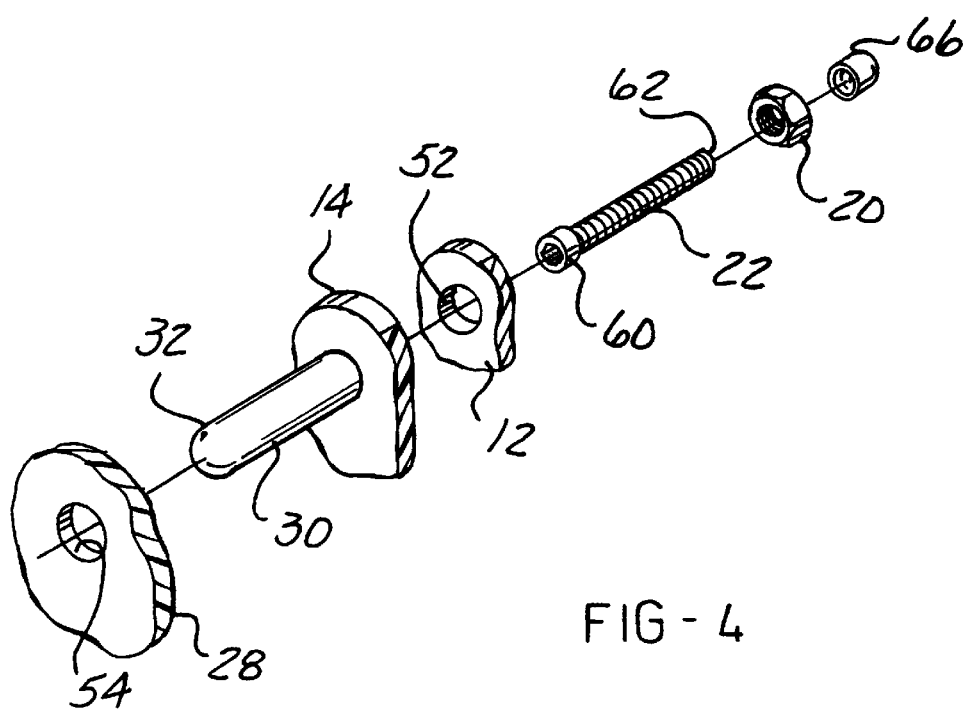
FIG. 4 is an enlarged, broken away, exploded perspective view of the integrally formed flexible entry boot of the present invention.

The bushing 30 portion of the seal member 14 is shown in its pre-installation state in FIG. 4. In FIGS. 2 and 3, it is shown installed. It can be seen that, during installation, the bushing 30 compresses tightly against wall 28 of fluid containment region 40, thereby enhancing the fluid-tight nature of the present invention.

Among the many advantages of forming end portions 32, bushings 30 and seal member 14 as an integral piece are the following. The boot 10 becomes easier and less expensive to manufacture and install, given the fewer number of parts. Further, the fluid-retaining integrity of boot 10 may be enhanced by having a one-piece seal member/bushing/screw cap-like end portion unit, in that there are fewer possible gaps through which fluid may leak.

As best seen in FIG. 3, seal member 14 includes a plurality of bores 50 extending transversely through seal member 14 for inserting the seal member-to-containment wall attaching means. Screw securing plate 12 includes a plurality of apertures 52. Containment wall 28 also contains a plurality of bores 54. The wall bores 54, plate apertures 52 and seal bores 50 are all in corresponding relation one to the other, as most clearly shown in FIG. 4. Any size and number of seal bores 50 and plate apertures 52 may be used. However, in the preferred embodiment, the seal member bores 50 are disposed evenly around seal member 14, as best seen in FIG. 1. Similarly, the screw plate apertures 52 are disposed evenly about screw plate 12.

Hollow sleeve 26 has an outer surface 38 and an inner, conduit receiving surface 36. Hollow sleeve 26 may further comprise an annular groove 34, disposed on outer surface 38 of support sleeve 26, for receiving the support sleeve-to-conduit attaching means. As best seen in FIG. 2, this annular groove 34 is releasably receiving hose clamp 18. In an alternate preferred embodiment, hollow sleeve 26 may further comprise two annular projections 64, disposed on, and preferably integrally formed in outer surface 38 of support sleeve 26, for receiving therebetween the support sleeve-to-conduit attaching means. As best seen in FIG. 2A, these annular projections 64 are releasably receiving hose clamp 18.

Hollow support sleeve 26 may further comprise at least one gripping flange 24a disposed on the inner, conduit receiving surface. A second gripping flange 24b is shown in FIGS. 2 and 2A.

Flexible entry boot 10 may also further comprise a protective cap or cover 66 formed in any suitable size and of any suitable material, such as nylon, acetal, polypropylene, polyethylene or rubber.

The flexible entry boot 10 as described hereinabove achieves, but is not limited to, the objects and advantages described more fully above.

Figure 5:
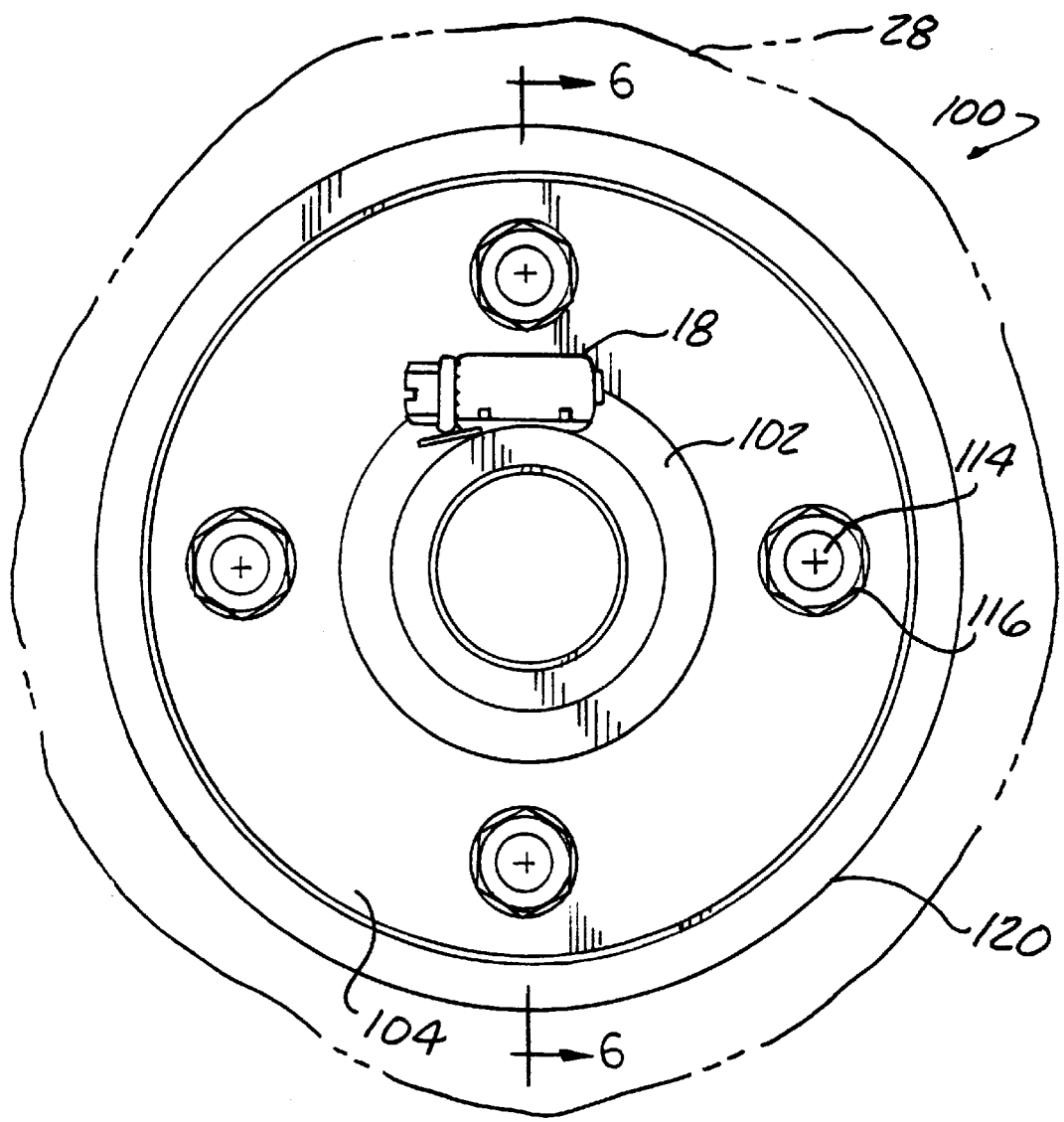
FIG. 5 is a front view of an alternate embodiment of the flexible entry boot of the present invention, with the wall of the containment region shown broken away in phantom.

Referring now to FIGS. 5–7, there is shown an alternate embodiment of the flexible entry boot of the present invention. In FIG. 5, the alternate embodiment of the flexible entry boot is designated generally as 100. Entry boot 100 provides a fluid-tight fitting between a wall 28 of a fluid containment region 40 and a conduit (not shown) passing through wall 28.

Flexible entry boot 100 comprises a seal member 102 disposed within containment region 40. Seal member 102 may also have sealing beads 103 integrally formed A therewith and extending outwardly therefrom. However, it is to be understood that separate sealing washers, gaskets, or the like, may also be used. This seal member 102 may be formed of any suitable material, depending upon the particular requirements due to the fluid contained. Preferably, the seal member 102 will be formed from an oil and gas resistant material, or any other material which will be resistant to alcohols and hydrocarbons. More preferably, the seal member 102 is comprised of nitrile rubber and/or viton rubber, thermoplastic elastomers or epichlorohydrin rubber. Further, seal member 102 may be of any suitable shape and size, depending upon the manufacturer and particular end use. In the preferred embodiment, the seal member 102 is circular, as shown in FIG. 5.

Flexible entry boot 100 may further comprise a screw securing plate 104 attached to seal member 102. Similarly, this screw securing plate 104 may also be of any desired size and shape and of any suitable material. In the preferred embodiment, the screw securing plate 104 is circular and is formed from a suitable metal material.

Referring now to FIG. 6, a flexibly rigid, cylindrical hollow support sleeve 106 has a degree of flexibility sufficient to allow for the insertion of the conduit at angles less than or equal to a 90° angle, i.e. the conduit does not need to be inserted precisely perpendicular to the containment wall 28 in order to maintain a fluid-tight environment, and has a degree of flexion such that if moved after fitted, the fluid-tight environment remains intact. The amount of flexion may be any suitable desired amount, however, in the preferred embodiment, the hollow sleeve 106 provides for up to approximately a 30° offset from normal (90°) in any direction.

Hollow sleeve 106 has a first open end portion 110 integrally attached to seal member 102, first open portion 110 having a central throughbore 108 in fluid communication with hollow support sleeve 106. Sleeve 106 has a second open end portion 112 opposed to, and integrally attached to first open portion 110, with first open portion 110 adapted to flexibly receive a conduit, and second open portion 112 adapted to releasably hold the conduit in place.

It is to be understood that hollow support sleeve 106 may be formed in any suitable shape and of any suitable material, and may provide any degree of flexion as necessitated by the particular manufacturer and end use, as long as such choices serve the objects and advantages of the present invention as set forth hereinabove.

Means are provided for releasably attaching hollow support sleeve 106 to the conduit. It is to be understood that this releasable conduit attaching means may comprise any suitable means. However, in the preferred embodiment, this conduit attaching means comprises a hose clamp 18.

Flexible entry boot 100 further comprises means, extending from outside containment region 40 into containment region 40, for releasably attaching seal member 102 to wall 28 of containment region 40. Again, it is to be understood that this seal member attaching means may comprise any suitable means. However, in the preferred embodiment, this attaching means comprises a plurality of screw 114 and nut 116 assemblies.

The screw and nut assemblies may be any conventionally known assemblies, and further, it is to be understood that any known and suitable fastening means may be used. In the preferred embodiment, as best seen in FIGS. 6 and 7, the seal member attaching means may further comprise a screw securing plate 118 which receives an end of each screw 114 adjacent its head. It is to be understood that this screw securing plate 118 may also be of any desired size and shape and of any suitable material. In the preferred embodiment, the screw securing plate 118 is circular and is formed from a suitable metal material. It is to be understood that, although washers 128 and hose clamp 18 may be removable, they have not been shown exploded away in FIG. 7, as it is presumed evident how these parts assemble.

Yet further, the seal member attaching means may comprise a flexible sealing member 120 tightly surrounding and conforming to an end 122 of each screw 114, as well as tightly surrounding and conforming to screw securing plate 118. Flexible sealing member 120 may further comprise integrally attached, outwardly extending sealing beads 124, as best seen in FIG. 7. However, it is to be understood that separate sealing washers, gaskets, or the like, may also be used.

This sealing member 120 may be formed of any suitable material, depending upon the particular requirements due to the fluid contained. Preferably, the seal member 120 will be formed from an oil and gas resistant material, or any other material which will be resistant to alcohols and hydrocarbons. More preferably, the seal member 120 is comprised of nitrile rubber and/or viton rubber, thermoplastic elastomers or epichlorohydrin rubber. Further, seal member 120 may be of any suitable shape and size, depending upon the manufacturer and particular end use. In the preferred embodiment, the seal member 120 is circular.

Any suitable screw 114 may be used, however, in the preferred embodiment, a ¼–20×2 HW 2132 stainless steel weld stud is used. It 114 may also be a conventional bolt, or a press-fit stud.

Preferably, securing plate 118, screw end 122 and flexible sealing member 120 are integrally formed into a unitary sealing/fastening member 126, as seen to the right of the exploded view of FIG. 7. It is to be understood that this may be by any suitable molding process, including injection molding.

As can clearly be seen in FIGS. 6 and 7, nut 116 and washer 128 are attached at a screw end 130 opposite the end 122 at which flexible sealing member 120 is disposed.

Flexible sealing member 120, in that it is exposed to the surrounding soil or other environment, is preferably formed from a suitable corrosion resistant material. It is to be understood that any suitable material may be used. However, in the preferred embodiment, member 120 is formed from the various rubber and/or polymeric materials described hereinabove.

The entry boot 100 is shown in its pre-installation state in FIG. 7. In FIGS. 5 and 6, it is shown installed. It can be appreciated that, during installation, the screw securing plate 104 and the screw securing plate 118 provide distribution of the sealing forces as the nuts 116 are tightened. This compresses seal member 102 and flexible sealing member 120 tightly against wall 28 of fluid containment region 40, thereby enhancing the fluid-tight nature of the present invention.

Among the many advantages of forming securing plate 118, screw end 122 and flexible sealing member 120 as an integral piece 126 are the following. The boot 100 becomes easier and less expensive to manufacture and install, given the fewer number of parts. Further, the fluid-retaining integrity of boot 100 may be enhanced by having a one-piece securing plate/screw end/flexible sealing member unit 126, in that there are fewer possible gaps through which fluid may leak.

As best seen in FIG. 6, seal member 102 includes a plurality of bores 132 extending transversely through seal member 102 for inserting the seal member-to-containment wall attaching means. Screw securing plate 104 includes a plurality of apertures 134. Containment wall 28 also contains a plurality of bores 54. Screw securing plate 118 also contains a plurality of apertures 136. The wall bores 54, plate apertures 134, seal bores 132 and plate apertures 136 are all in corresponding relation one to the other, as most clearly shown in FIG. 7. Any size and number of seal bores 132 and plate apertures 134, 136 may be used. However, in the preferred embodiment, the seal member bores 132 are disposed evenly around seal member 102, as best seen in FIG. 5. Similarly, the screw plate apertures 134 are disposed evenly about screw plate 104, and screw securing plate apertures 136 are disposed evenly about screw securing plate 118.

Hollow sleeve 106 has an outer surface 38' and an inner, conduit receiving surface 36'. Hollow sleeve 106 may further comprise an annular groove 34', disposed on outer surface 38' of support sleeve 106, for receiving the support sleeve-to-conduit attaching means. As best seen in FIGS. 6 and 7, this annular groove 34' is releasably receiving hose clamp 18.

Hollow support sleeve 106 may further comprise at least one gripping flange 24a' disposed on the inner, conduit receiving surface 36'. A second gripping flange 24b' is shown in FIGS. 6 and 7.

Flexible entry boot 100 may also further comprise a protective cap or cover (not shown, but similar to cap 66 described in the first embodiment) formed in any suitable size and of any suitable material, such as nylon, acetal, polypropylene, polyethylene or rubber.

Referring now to FIG. 8, an alternate embodiment of the flexible entry boot of FIGS. 6 and 7 is shown, designated generally as 100'. Boot 100' is as disclosed above in relation to boot 100, but includes the following differences.

The seal member attaching means may comprise a flexible sealing member 120' tightly surrounding and conforming to an end 122 of each screw 114. In this embodiment, the screw securing plate 118 has been eliminated. However, it is to be understood that plate 118 may be used in this embodiment if desired and/or necessary for a particular installation, as shown in FIG. 9. Flexible sealing member 120' may further comprise integrally attached, outwardly extending sealing beads 124, as best seen in FIG. 7. However, it is to be understood that separate sealing washers, gaskets, or the like, may also be used.

Flexible sealing member 120' has integrally extending outwardly therefrom a flexibly rigid ducting boot 152 to accommodate a perforated ducting system (not shown). The perforated ducting system may be secured within boot 152 by any suitable means. However, in the preferred embodiment, the ducting system securing means comprises hose clamps 154, 156 received within annular grooves 158, 160, respectively.

This sealing member 120' may be formed of any suitable material, depending upon the particular requirements due to the fluid contained. Preferably, the seal member 120' will be formed from an oil and gas resistant material, or any other material which will be resistant to alcohols and hydrocarbons. More preferably, the seal member 120' is comprised of nitrile rubber and/or viton rubber, thermoplastic elastomers or epichlorohydrin rubber. Further, seal member 120' may be of any suitable shape and size, depending upon the manufacturer and particular end use. In the preferred embodiment, the seal member 120' has a generally circular cross section, as does the flexibly rigid ducting boot 152 portion of member 120'.

The flexible entry boot 100' (as well as any of the boots described hereinabove) may optionally comprise a flexibly rigid, hollow reducer fitting 150 adapted to be snap-fit within the hollow support sleeve 106. This fitting 150 may be used in order to accommodate piping of a diameter lesser than that accommodated by the sleeve 106 alone.

The flexible entry boots 100, 100' as described hereinabove achieve, but are not limited to, the objects and advantages described more fully above.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A ducted flexible entry boot assembly for providing a fluid-tight fitting between a wall of a fluid containment region and a conduit passing through the wall, the ducted flexible entry boot assembly comprising:

a seal member adapted to be disposed within the containment region;

a securing plate, adapted to be disposed within the containment region and releasably mounted to the seal member;

a hollow support sleeve integral with the seal member and adapted to extend axially into the containment region, the support sleeve having an outer surface and an inner, conduit receiving surface, the hollow support sleeve further having a degree of flexibility sufficient to allow for the insertion of the conduit at angles equal to or other than an angle normal to the fluid containment wall while maintaining a fluid-tight environment;

means for releasably attaching the hollow support sleeve to the conduit;

a flexible, corrosion resistant sealing ring member adapted to be disposed outside the containment region;

a flexibly rigid ducting boot integrally formed with, and extending outwardly from the sealing ring member; and means, carried by the sealing ring member, for releasably attaching the seal member to the wall of the containment region.

2. The ducted flexible entry boot as defined in claim 1, further comprising a second securing plate, adapted to be disposed outside the containment region.

3. The ducted flexible entry boot as defined in claim 2 wherein the corrosion resistant sealing ring member tightly surrounds and conforms to the second securing plate and wherein the flexible sealing ring member and the second securing plate are integrally formed into a unitary member.

4. The ducted flexible entry boot as defined in claim 2 wherein the securing plate and the second securing plate are both annular, and wherein the hollow support sleeve is cylindrical.

5. The ducted flexible entry boot as defined in claim 2 wherein the seal member has a plurality of bores extending transversely therethrough, the bores disposed evenly around the seal member.

6. The ducted flexible entry boot as defined in claim 5 wherein the securing plate is a screw securing plate having a plurality of apertures disposed evenly therearound and in corresponding relation to the seal member bores.

7. The ducted flexible entry boot as defined in claim 6 wherein the means for releasably attaching the seal member comprises a plurality of screw and nut assemblies adapted to extend from outward the containment region thereinto, and wherein each screw has a head.

8. The ducted flexible entry boot as defined in claim 7 wherein the second securing plate receives an end of each screw adjacent each of the heads, the second securing plate having a plurality of apertures disposed evenly therearound and in corresponding relation to the seal member bores.

9. The ducted flexible entry boot as defined in claim 8 wherein the sealing ring member tightly surrounds and conforms to the end of each screw and to the second securing plate, and wherein the flexible sealing ring member and the second securing plate are integrally formed into a unitary member.

10. The ducted flexible entry boot as defined in claim 1 wherein the seal member is substantially circular-shaped, and is oil and gas resistant.

11. The ducted flexible entry boot as defined in claim 10 wherein the corrosion resistant sealing ring member is substantially circular-shaped, and wherein the seal member, the sealing ring member, and the flexibly rigid ducting boot are formed from nitrile rubber.

12. The ducted flexible entry boot as defined in claim 1 wherein the means for releasably attaching the hollow support sleeve comprises a hose clamp, extendable around the support sleeve outer surface.

13. A fluid containment system having a ducted flexible entry boot assembly for providing a fluid-tight fitting between a wall of a fluid containment region and a conduit passing through the wall, the ducted flexible entry boot assembly comprising:

a seal member disposed within the containment region;

a securing plate disposed within the containment region and releasably mounted to the seal member;

a hollow support sleeve integral with the seal member and extending axially into the containment region, the support sleeve having an outer surface and an inner, conduit receiving surface, the hollow support sleeve further having a degree of flexibility sufficient to allow for the insertion of the conduit at angles equal to or other than an angle normal to the fluid containment wall while maintaining a fluid-tight environment;

means for releasably attaching the hollow support sleeve to the conduit;

a flexible, corrosion resistant sealing ring member disposed outside the containment region;

a flexibly rigid ducting boot integrally formed with, and extending outwardly from the sealing ring member; and means, carried by the sealing ring member, for releasably attaching the seal member to the wall of the containment region;

wherein the seal member may be removed and replaced from within the containment region.

14. The fluid containment system as defined in claim 13 wherein the seal member has a plurality of bores extending transversely therethrough, the bores disposed evenly therearound, and wherein the securing plate is a screw securing plate having a plurality of apertures disposed evenly therearound and in corresponding relation to the seal member bores.

15. The fluid containment system as defined in claim 14 wherein the means for releasably attaching the seal member comprises a plurality of screw and nut assemblies extending from outward the containment region thereinto.

16. The fluid containment system as defined in claim 15 wherein the sealing ring member tightly surrounds and conforms to an end of each screw, and wherein the flexible sealing ring member and the end of each screw are integrally formed into a unitary member.

\* \* \* \* \*